Patented Nov. 22, 1949

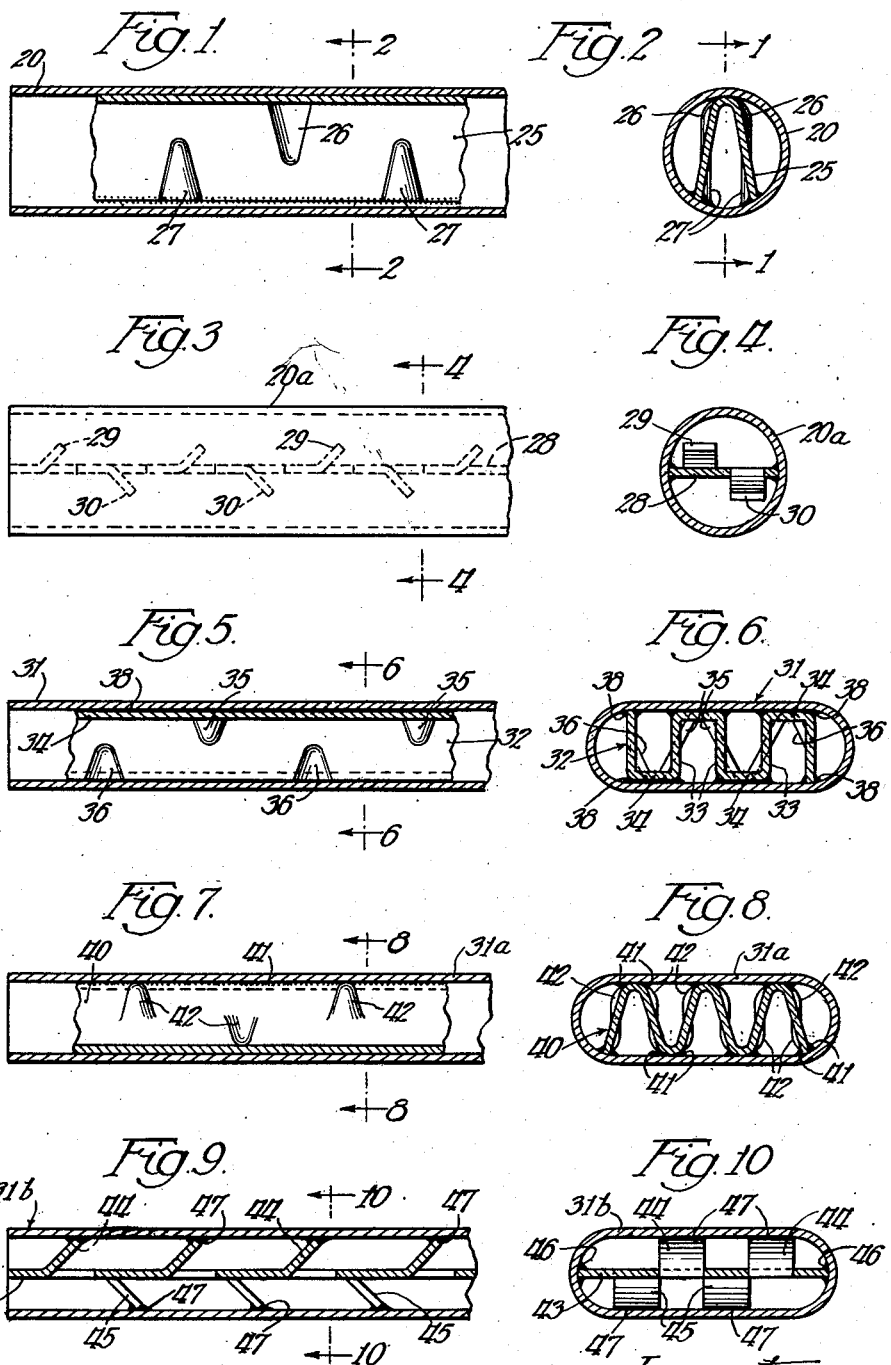

2,488,615

UNITED STATES PATENT OFFICE 2,488,615

OIL COOLER TUBE

Arthur B. Arnold, Racine, Wis., assignor to Modine Manufacturing Company, Racine, Wis., a corporation of Wisconsin Original application November 11, 1942, Serial No. 465,198. Divided and this application June 5, 1944, Serial No. 538,757

6 Claims. (Cl. 138—38)

The present invention relates to a fluid conduit for heat transfer cores and comprises in general a tube provided with a certain internal fin construction for the sole purpose of carrying out the principles of this invention. This tube may be utilized in any type of heat exchange unit and, obviously, may be used with cores having an enclosed water jacket surrounding said tubes or the tubes may be provided with fins joining the exteriors thereof and exposed for heat dissipation in the usual manner as is known in the art.

The subject matter of the present application has been divided out from my pending application for patent on Oil cooler tube, filed November 11, 1942, Serial No. 465,198, now patent dated April 10, 1945, No. 2,373,218.

The fluid conduit of the present invention is primarily directed and more specifically adapted for use in an oil cooler, but need not be limited thereto. One of the problems encountered in the cooling of the lubricating oils is to provide an oil cooler with tubes that will function efficiently in carrying out the purpose for which the unit is intended inasmuch as several of the conditions which prevail are difficult to overcome. One of the conditions is the difficulty encountered in producing oil flowage in the tubes of an oil cooling core by reason of the relatively high viscosity or general sluggishness of lubricating oils and the more particular problem being the manner in which this viscosity is so rapidly increased with a decrease in the temperature of the oil. For example, with ordinary automobile lubricating oil of the SAE No. 30 grade, it is found that oil of this viscosity will take approximately sixty seconds 210° F. to pass through a certain sized orifice, while the same oil will require four-hundred seconds to flow through the same orifice when the temperature of this oil is reduced to 110° F.

It is a known fact that liquids passing through conduits such as tubes will have a higher velocity at the central portions of the tubes with respect to the liquid which flows adjacent the walls of the tubes by reason of the normal frictional reaction of said walls. This is true for any form of liquid which may be compelled to pass through tubes, pipes, or any other forms of conduits. However, when such tubes are used to pass oil, this normal frictional phenomenon referred to is complicated and aggravated by the variable viscosity condition of the body of the oil, particularly when the oil is subjected to colder temperatures. The effect of the lower temperatures on oil being forced through a cold tube or other passage within any type of oil cooler is that the oil next adjacent the internal tube walls or surfaces will become thick and sluggish due to its intimate contact with the cold walls of the tube and will tend to adhere to the surface or walls of the tube and actually function as a retarded insulating layer of oil to impede the flow of heat from the higher temperature oil that is passing through the central or core area of the tube, thereby substantially producing a concentric cellular stratification of the oil within a tube.

In addition to the foregoing problem, a tube of an oil cooler must also be made and constructed so as to be capable of withstanding considerable pressure. The pressure will run far above normal during the warm-up periods when the oil is substantially congealed at lower temperatures and may later be substantially negligible when the oil has become warm and thin after complete and efficient oil flow has been established in such a tube of an oil cooler.

Therefore, one of the main objects of the present invention is to provide a tube of an oil cooler with a suitable internal vane or fin structure to provide a means for inducing turbulence into the oil stream within a tube. This will cause induced intermingling of the various portions of the oil stream flowing through a tube and, consequently, will counteract and break up the cellular stratification hereinbefore referred to, so that a better dispersion of heat will result in said stream of oil. By quickly dispersing the heat of the stream of oil throughout the tubular volume thereof this will obviously reduce the viscosity of that part of the stream of oil adjacent to the tube wall and tend to accelerate the flow of oil relieving internal pressures within the tube and at the same time also distributing heat uniformly to all sections of the tube during the warm-up process of an oil cooler.

Another object of the present invention is also to design the vanes or fin dividers for the purpose of increasing the heat transfer surface within the confines of an oil cooler tube for the purpose of better heat dissipation during the warm-up period of the oil and oil cooler which increased heat transfer surface shall subsequently function to accelerate the excess heat dissipation of the oil when said tube and the core act as a means for cooling the oil.

One of the other objects of the tube of the present construction is the manner in which the internal structure of the tube is arranged and connected therewith so as to form internal supporting structures that will guard against distortion of the tube and which will act in tension and compression to prevent the rupture or collapse of said tube depending upon the pressure differential within and outside of the tube.

Another object is the provision of a fin member within the confines of a tube having a number of connected webs bonded to the internal wall of the tube, and formed with embossments extending into the fluid passages with their edges bonded to the tube.

All other objects and advantages shall hereinafter appear in the following detailed description having reference to the accompanying drawings.

In the drawings:

Fig. 1 is a longitudinal sectional view of one form of tube as taken substantially along the line 1—1 of Fig. 2.

Fig. 2 is a transverse sectional view taken along the line 2—2 of Fig. 1.

Fig. 3 is a side elevational view of another form of tube illustrating an internal divider functioning as a strengthening means and also as a means for producing turbulence similar to the form shown in Figs. 1 and 2.

Fig. 4 is a transverse sectional view as taken substantially along the line 4—4 of Fig. 3.

Figs. 5, 7 and 9 are all longitudinal sectional views of tubes embodying modified constructions of tube fins or dividers for carrying out the principles of the present invention; while Figs. 6, 8 and 10 are transverse sectional views taken substantially as indicated in Figs. 5, 7, and 9, respectively.

From the various disclosures of the different tubes in the drawings, it is obvious that numerous modified constructions of tubes may be presented for carrying out the objects of the present invention and a considerable number thereof have been illustrated. Any one of the tubes shown may be used in heat transfer cores or more specifically in oil coolers for the purpose hereinbefore pointed out and it should also be noted that these tubes may be used in such a manner as to be surrounded with water or some other liquid of high heat carrying capacity, or the outside of the tubes may be provided with fins or other extended surfaces for dissipating the heat to a stream of air or other gas, or any fluid of low heat carrying capacity. Such structures have not been illustrated and the present explanation shall be confined directly to the tube constructions, per se.

In the tube illustrated in Figs. 1 and 2, the tube 20 is provided with a U-shaped fin 25 having a plurality of webs for dividing the tube into a plurality of cells or chambers and the walls of the fin 25 are preferably embossed as at 26 and 27, whereby portions of the fin 25 are disposed in the path of the stream of oil to produce the desirable turbulence sought. As seen in Fig. 1, the projections or indentations 26 and 27 are illustrated in staggered relation to the particular wall of the fin shown, and it is also contemplated to place these deformed portions in vertical alignment, should that be desirable. The edges of the fin 25 and the U-bend thereof, as well as the edges of the projections or indentations, are metallically bonded to the inner wall of the tube 20. This form of tube, as well as the other forms herein disclosed, are all primarily designed in such a manner that a single brazing operation will serve to bond the tubes and the fins within the confines thereof, as well as any external fins that may be associated therewith.

Figs. 3 and 4 also illustrate a tube 20a of circular cross-section having a fin 28 positioned therein, as best shown in Fig. 4. This fin 28 is provided with ears 29 and 30 which are oppositely disposed with respect to the fin 28 and project into the path of the stream of oil which may be flowing through the tube. The edges of the fin 28 are metallically bonded to the inner walls of the tube 20a.

Figs. 5 and 6 illustrate a flattened form of tube 31 having the fin member 32 secured therein. This fin member is provided with a plurality of webs 33 which are disposed normal to the flat sides of the tube and the connecting portions 34 of the fin 32 lie contiguously and adjacent to the flat walls of the tube. By the latter adjacent contact with the walls of the tube, the internal heat transfer surface of the oil cooler tube is greatly increased by the added surface contact which greatly induces heat conductivity within the physical confines of the internal fin 32 and tube 31.

By placing the legs 33 of the fin 32 normal to the flat surface of the tube 31, the relatively thin walls of the tube are considerably strengthened and held against rupture or collapse, as the case may be. The present internal fin 32 is provided with embossments such as deflectors 35 and 36 which project into the stream of the oil flowing through the tube for the purpose of producing turbulence of the oil stream within said tube. The internal fin is preferably brazed or soldered to the tube 31 substantially along the points indicated by 38.

The tube 31a in Figs. 7 and 8 is provided with an internal fin 40 having a plurality of connected webs, with the respective apexes thereof being suitably secured or connected by brazing or soldering to the tube 31a at points substantially indicated at 41. The fin 40 which divides the interior area of the tube 31a into a plurality of longitudinal passageways is generally straight sided longitudinally of said tube and forms a strong internally braced tube with greatly increased heat transfer surface within the confines of said tube. The webs of the fin 40 are provided with suitable embossments such as deflectors 42 in the sides thereof for the purpose of inducing turbulence in the manner hereinbefore described in connection with the previous figures.

Figs. 9 and 10 also illustrate the use of a tube such as 31b which is in this case provided with a longitudinally extending internal fin 43 traversing the long dimension of the tube, and this fin 43 is provided with alternately disposed deflecting members 44 and 45 which extend to and meet the flat side walls of the tube 31b. The fin 43 is bonded to the tube 31a as at 46 and each of the deflecting members or projections 44 and 45 are also bonded to the side walls or flat sides of the tube substantially as indicated at 47. In the latter form of tube construction, the portions of the fin that are deformed or struck out of the surface thereof will in this case function as the means for inducing the turbulence within the oil stream in the tube to accelerate the equal heat dissipation therein and the same deflecting members also function as struts or reinforcing members for preventing the rupture or collapse of the shell or tube 31b.

From the above it will be apparent that I have provided an oil cooler tube wherein the passage therethrough is divided into a plurality of smaller fluid passageways, by a fin member having one or more webs provided with embossments or protuberances that project into the fluid stream and set up turbulence therein whereby to more effectively cause heat transference from the fluid to the tube walls.

Inasmuch as there are other numerous possibilities of modifying and rearranging the various structural elements as illustrated in the numerous modifications disclosed herein, the present invention is not to be limited to any particular form, construction, arrangement or combination of parts excepting insofar as shall be governed by the breadth and scope of the appended claims.

What I claim as new and desire to secure by Letters Patent is:

1. A fluid conduit for the passage of a fluid stream in a heat transfer core comprising an outer shell and a straight internal fin member rigidly bonded to the walls of said shell and traversing the internal area of said shell, and deflecting members projecting out of the plane of said fin member and terminating at the shell walls whereby turbulence is created in said fluid stream, and said deflecting members also being securely united with the walls of said shell to function as strut members to reinforce said shell.

2. A fluid conduit for heat transfer cores comprising a tube and a straight fin member within the confines of said tube to divide the latter into a plurality of fluid passageways, said fin member having edge portions thereof bonded to the inner wall of said tube, and said fin member having also lateral projections extending into the fluid passageways with their edges bonded to the inner wall of the tube.

3. A fluid conduit for heat transfer cores comprising a tube and a fin member within the confines of said tube to divide the latter into a plurality of fluid passageways, said fin member having edge portions thereof bonded to the inner wall of said tube, and said fin member having also embossments extending into the fluid passageways with their edges bonded to the inner wall of the tube.

4. A fluid conduit for heat transfer cores comprising a tube and a fin member within the confines of the tube and comprising a plurality of connected webs to divide the tube into a plurality of fluid passageways, said webs having embossments adjacent and extending to the edges of the webs, and the opposite edges of the fin member contacting with and being bonded to the inner wall of the tube.

5. A fluid conduit for heat transfer cores comprising a tube and a U-shaped fin member within the confines of the tube with its opposite edges bonded to the inner wall of the tube, the two webs of the fin member having embossments extending to the tube wall and bonded thereto.

6. A fluid conduit for heat transfer cores comprising a tube of elongated cross section, and a fin member of corrugated cross section therein, the webs of said fin member having embossments at the apexes of the corrugations projecting into the fluid passageways formed by the tube and fin member, the edges and apexes of the fin member and the edges of the embossments being bonded to the inner wall of the tube.

ARTHUR B. ARNOLD.

REFERENCES CITED

The following references are of record in the file of this patent:

UNITED STATES PATENTS

| Number | Name | Date |
|---|---|---|
| 42,049 | Martin | Mar. 22, 1864 |
| 874,673 | Kreen | Dec. 24, 1907 |
| 1,056,373 | Segelken | Mar. 18, 1913 |
| 1,947,606 | Lonergan | Feb. 20, 1934 |
| 2,096,272 | Young | Oct. 19, 1937 |
| 2,289,097 | Brinen | July 7, 1942 |
| 2,289,163 | Andersen | July 7, 1942 |
| 2,335,687 | Modine | Nov. 30, 1943 |

FOREIGN PATENTS

| Number | Country | Date |
|---|---|---|
| 99,486 | Sweden | July 30, 1940 |
| 242,218 | Germany | Dec. 28, 1911 |
| 418,181 | Great Britain | Oct. 29, 1934 |